May 30, 1933. J. G. MATHIESON 1,911,912
APPARATUS FOR TRANSFERRING ROD BUNDLES
Filed Sept. 11, 1931
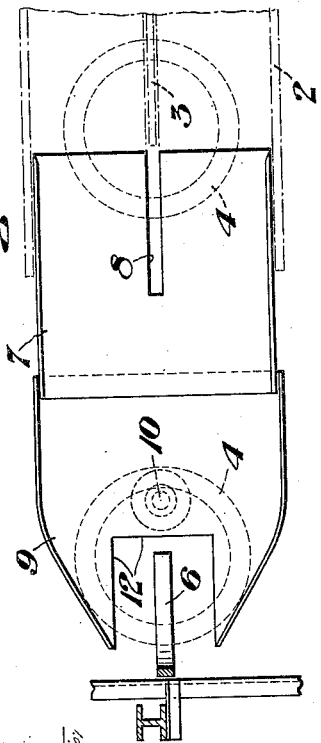
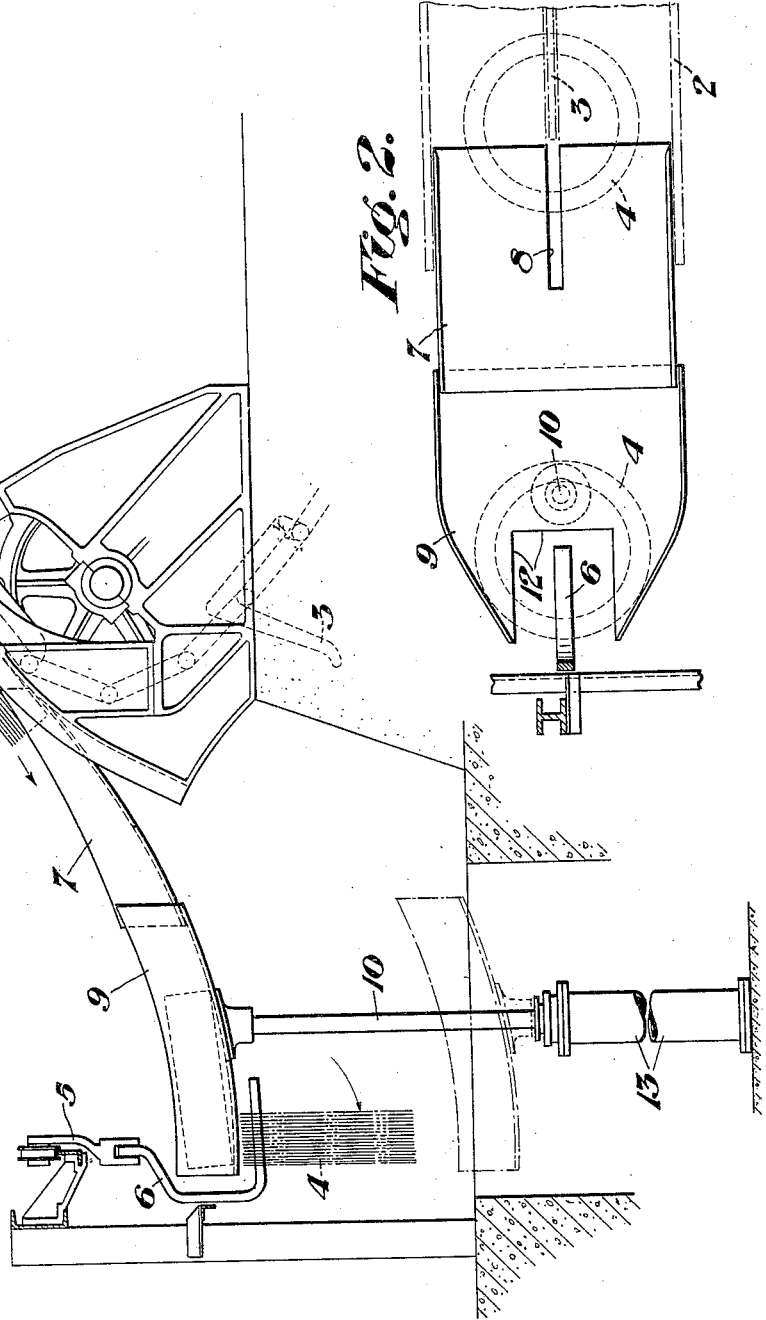
Inventor:
JOHN G. MATHIESON,
by Usina & Rauber
his Attorneys.

Patented May 30, 1933

1,911,912

UNITED STATES PATENT OFFICE

JOHN G. MATHIESON, OF DONORA, PENNSYLVANIA, ASSIGNOR TO THE AMERICAN STEEL AND WIRE COMPANY OF NEW JERSEY, A CORPORATION OF NEW JERSEY

APPARATUS FOR TRANSFERRING ROD BUNDLES

Application filed September 11, 1931. Serial No. 562,339.

This invention relates to a rod bundle transfer machine especially adapted for use between endless rod bundle conveyers and a traveling hook conveyer spaced therefrom, one of the objects being to provide a machine of this character which will transfer rod bundles from the traveling conveyer to one of the hooks of the traveling hook conveyer without inverting the bundles thereon. Other objects may later become apparent.

In the drawing:

Figure 1 is a side view of an example of the invention.

Figure 2 is a top plan view thereof.

Having reference to the drawing, there is shown an endless conveyer 2 having a number of arms 3 for carrying rod bundles 4. A traveling hook conveyer 5 is spaced from the delivery end of the conveyer 2 and is shown with one of its hooks 6 positioned to receive one of the rod bundles 4 for further conveyance thereof.

The top coil of rod of the bundles 4 is generally delivered by the conveyer 2 in a somewhat damaged condition, it being necessary to cut this damaged part off from the coil. It has generally been customary in transferring the rod bundles from one of these conveyers to the other to invert the bundles so that the top coil is toward the closed end of the hook 6, making it very difficult to cut off and remove the damaged coil. The rod bundle transfer machine and method forming the subject of this invention is characterized by the fact that it provides for the transfer of rod bundles from a delivering conveyer to a hook conveyer without inverting the same on the hook of this latter conveyer, so that the damaged coils of rod are carried outermost and may easily be cut off and removed.

As shown, the machine consists of a chute member 7 having a slot 8, this chute member being positioned with its slotted end proximate the delivering end of the conveyer 2, the arms 3 having free passage through the slot 8. A basket member 9 is arranged proximate the other end of the chute 7 and is positioned by a carrier rod 10 above the carrying end of the hook 6 for vertical reciprocation in the path thereof. The basket member 9 has a cut-out portion 12 which permits this basket member to reciprocate up and down by the end of the hook 6. The member 10 is shown operated by a power cylinder 13, connections for this cylinder not being shown as it is purely an illustrated method of reciprocating the rod 10.

The method of transferring the rod bundles is as follows:—The arm 3, carrying the rod bundle 4, is carried down and through the slot 8 of the chute member 7 by the endless conveyer 2. This deposits the rod bundle in the chute 7 with its top damaged coil uppermost, this rod bundle sliding down the chute and into the basket member 9. The cylinder 13 is operated so that the basket member moves downward and the rod bundle becomes engaged by the end of the hook 6. When the basket member 9 is moved to its lowermost position the rod bundle 4 will be carried by the end of the hook 6 with its damaged coil outermost because at no time has it been inverted. These various described motions are illustrated by dotted lines in the drawing.

Although a specific form of this invention has been shown in accordance with the patent statutes, it is not intended to limit the scope of this invention exactly thereto, except as is defined in the appended claim.

I claim:

In combination with an endless rod bundle conveyer and a traveling hook conveyer, a vertically movable basket member having a cut away portion to permit passage by said hook members of said second named conveyer, power means for normally supporting said basket member in bundle receiving position above the path of travel of the hooks of said second named conveyer and for lowering and raising said basket member to discharge the bundle from said basket member onto one of the hooks of said second named conveyer and returning the basket member to bundle receiving position, and a chute member constructed and arranged to receive rod bundles from said first named conveyer and to direct said bundles onto said basket member.

In testimony whereof, I have hereunto set my hand.

JOHN G. MATHIESON.